United States Patent [19]

Smith

[11] Patent Number: 6,064,883
[45] Date of Patent: May 16, 2000

[54] METHOD AND APPARATUS FOR AUTONOMOUS USER TERMINAL ASSIGNMENT OF TIME AND FREQUENCY SLOTS FOR CALL HANDOFF

[75] Inventor: Ronald P. Smith, Redondo Beach, Calif.

[73] Assignee: TRW Inc., Redondo Beach, Calif.

[21] Appl. No.: 09/112,875

[22] Filed: Jul. 9, 1998

[51] Int. Cl.[7] .................................................. H04B 7/185
[52] U.S. Cl. ............................................ 455/428; 455/430
[58] Field of Search ................................ 455/12.1, 13.1, 455/422, 427, 428, 429, 430, 517, 524; 370/315, 316, 319, 321, 323, 325, 341, 330, 331

[56] References Cited

U.S. PATENT DOCUMENTS

| | | |
|---|---|---|
| 4,707,841 | 11/1987 | Yen et al. . |
| 4,783,779 | 11/1988 | Takahata et al. . |
| 4,858,225 | 8/1989 | deSantis . |
| 4,866,710 | 9/1989 | Schaeffer . |
| 5,161,248 | 11/1992 | Bertiger et al. .......................... 455/428 |
| 5,195,091 | 3/1993 | Farwell et al. . |
| 5,210,771 | 5/1993 | Schaeffer et al. . |
| 5,212,831 | 5/1993 | Chuang et al. . |
| 5,280,630 | 1/1994 | Wang . |
| 5,293,382 | 3/1994 | Carson et al. . |
| 5,351,269 | 9/1994 | Schilling . |
| 5,363,375 | 11/1994 | Chuang et al. . |
| 5,367,539 | 11/1994 | Copley . |
| 5,404,574 | 4/1995 | Benveniste . |
| 5,450,413 | 9/1995 | Hazama . |
| 5,455,821 | 10/1995 | Schaeffer et al. . |
| 5,483,664 | 1/1996 | Moritz et al. ........................... 455/428 |
| 5,491,837 | 2/1996 | Haartsen . |
| 5,515,374 | 5/1996 | Atkinson . |
| 5,533,023 | 7/1996 | Ohlson et al. . |
| 5,588,020 | 12/1996 | Schilling . |
| 5,589,967 | 12/1996 | Auffret . |
| 5,613,198 | 3/1997 | Ahmadi et al. . |
| 5,617,412 | 4/1997 | Delprat et al. . |

*Primary Examiner*—Thanh Cong Le
*Attorney, Agent, or Firm*—Michael S. Yatsko

[57] ABSTRACT

A method and apparatus for autonomous assignment of communications channels during call handoffs by a user terminal in a satellite-based telecommunications system. The method comprises the steps of transmitting a request for access from a user terminal to a control center via at least one satellite and selecting channel parameters and model assignment information for a first communications channel at the control center. The assignment information identifies predictable events which require the first user terminal to switch to a second communications channel. The channel parameters and model assignment information are transmitted from the control center to the first user terminal. A communications link is established over a first channel with the first user terminal. While the communications link with the first user terminal over the first channel is maintained, the user terminal autonomously switching its communications link to a second communications channel based on model assignment information identifying a predictable event preventing the first user terminal from continuing to use the first communications channel.

36 Claims, 4 Drawing Sheets

METHOD AND APPARATUS FOR AUTONOMOUS USER TERMINAL ASSIGNMENT OF TIME AND FREQUENCY SLOTS FOR CALL HANDOFF

BACKGROUND OF THE INVENTION

The present invention relates to satellite based telecommunications systems. More specifically, the invention relates to an autonomous communications channel assignment system.

Today, satellite systems have been proposed to transmit and receive telecommunications signals to and from user terminals. Such satellite based telecommunications systems may utilize a constellation of satellites and at least one Network Operations Center (NOC) to relay communications signals to and from the user terminals (fixed or mobile). The satellites may be cross-linked. Each satellite includes at least one antenna which defines the satellite's coverage region on the earth called its footprint. The satellite antenna(s) may divide the footprint into multiple beam spots called cells, or the footprint may be a single cell. Each cell is assigned one or more frequency bandwidths (subbands), along which communications signals travel between the satellite and each user terminal within that cell. Each of these subbands may support communications from a plurality of user terminals. In addition, adjacent cells may not be able to use the same subbands simultaneously. Depending on the system design, there may be a minimum distance between cells that may re-use the same subbands simultaneously. This distance is referred to as the frequency reuse distance.

The user terminals communicate along preassigned communications channels having a preassigned subband centered about a carrier frequency. In a frequency division multiple access system (FDMA), only one user terminal within a cell may transmit at a particular carrier frequency or slot. In a time division multiple access system (TDMA), multiple user terminals in one cell may transmit on one particular carrier frequency. In this latter type of system, each user terminal is assigned one or more time intervals or slots during which it may communicate over the shared carrier frequency. An FDM/TDMA system uses multiple frequencies and time slots. Multiple user terminals in a given cell, or within the frequency reuse distance, communicate with a single satellite or adjacent satellites in a non-interfering manner by using different carrier frequencies during the same time slot, and/or by using the same carrier frequency (frequency slot) but only during mutually exclusive time slots.

As illustrated in FIG. 3, each user terminal communicates by transmitting data packets at a preassigned frequency slot during a preassigned time slot to the satellite that defines the cell within which the user terminal is located. In order to obtain an initial time and frequency slot to use for communication, the user terminal sends an access request to the NOC, informing the NOC that the user terminal desires a channel within the system (step 36). The access request is conveyed to the NOC via one or more satellites (step 38). In response thereto, the NOC selects an available time and frequency slot. The NOC responds by sending the selected time and frequency slot assignment to the new user terminal, again via one or more satellites (steps 40 and 42). Once the user terminal receives the assigned time and frequency slot, the user terminal tunes its frequency and timing accordingly and may begin communicating (step 44).

The user terminal transmits data packets of information which include a header containing the destination address to which the data should be transmitted (step 46). Throughout the time during which a user terminal communicates over the assigned time and frequency slots, the NOC checks to see if any contentions may occur for time and frequency slots currently in use (steps 48 and 50). The necessary operations conducted by the NOC can be implemented in a computer program which can be partitioned into subroutines for each satellite coverage area. The NOC identifies contentions by conducting a current satellite orbit submodel (SOS). The current SOS represents a subset or submodel of a model of the system's overall satellite orbit constellation (hereinafter, the satellite orbit model or SOM). The SOS further comprises a plurality of SOS assignments which correspond to each user terminal's time and frequency slot assignments at a given time (starting point). A contention may be due to either predictable or unpredictable events.

An example of a common predictable event, is when a user terminal must switch to a different cell due to known (e.g., predictable) movement of the satellite relative to the Earth. For example, if a particular satellite contains Chicago within its coverage area, and that satellite is orbiting the Earth at a known speed, the system can predict the exact moment at which that satellite will move into a position containing, for example, Los Angeles in its coverage area and out of the location where it covers Chicago. Because the NOC keeps track of the precise location and speed of every satellite by running the system's overall SOM, the NOC knows when to perform a user terminal call handoff.

Another predictable event, for example, relates to the situation in which a given satellite footprint may contain a non-uniform distribution of users within different cells of the footprint. As the satellite moves and the cells move across the earth, the quantity of users in the various cells changes with some cells increasing quantity of users and other cells decreasing quantity of users. Call handoffs for some users in the cells with increasing quantity of users may be needed to avoid contention. These required handoffs can be predicted by the SOM and by the individual SOSs.

Unpredictable events include occurrences such as when (1) a current user terminal wants to increase the data transmission rate; (2) a current user terminal must switch to a different cell because of the user terminal's movement; and (3) several new user terminals request access to the system, thereby increasing the system's overall congestion sufficiently to make the current SOS assigned by the NOC inefficient. In some systems, predictable events typically occur more frequently than unpredictable events. Each time a predictable or unpredictable event occurs that creates a contention, the NOC must assign new values for the user terminal's time and/or frequency slots (step 52). The NOC assigns, to the user terminal, new time/frequency slots by transmitting the new assignment information over a communications channel associated with the user terminal. The NOC is able to determine what time/frequency slot values are available because it keeps track of every channel being used in the system by continuously running the system's overall SOM. Thus, based on the available channels, the NOC may assign new time/frequency slots to any user terminal. This assignment information is considered overhead communications as it uses up bandwidth which would otherwise be available for carrying communications data. Hence, the transmission of assignment information decreases the overall capacity of the system. At times the amount of assignment information becomes quite significant, and thus has a substantial detrimental impact upon the bandwidth available to carry communications data.

A need remains for improved capacity for satellite-based telecommunication's systems.

SUMMARY OF THE INVENTION

It is an objective of the present invention to eliminate, to the extent possible, overhead communications between the NOC and the user terminals, thus maximizing the amount of available capacity to carry substantive data transmission.

It is another objective of the present invention to maximize the amount of substantive data being transmitted among user terminals in the system.

It is a corollary objective of the present invention to increase the overall efficiency of the system.

It is a further objective of the present invention to minimize the amount of overhead being transmitted over the system.

It is yet a further objective of the present invention to minimize the amount of communication between the NOC and each user terminal.

It is yet a further objective of the present invention to allow each user terminal to determine independently and automatically when to implement a call handoff.

Another objective of the present invention is to allow each user terminal to determine autonomously what time and frequency slot to switch to in response to the occurrence of a predictable event.

The foregoing and other objects of the present invention are achieved by a satellite based telecommunications system for communicating information to and from one or more user terminals. According to the preferred embodiment, first, a user terminal sends to the Network Operations Center (NOC) a request for access to the system. To do so, the request is transmitted from the user terminal to the satellite by which this user terminal is covered. The request is transferred from the user terminal to the NOC via one or more satellites. According to one embodiment, the satellites are interconnected via crosslinks. When satellite crosslinks exist, once the covering satellite receives the request, the satellite determines if the NOC is within the satellite's coverage area. If it is, the satellite sends the request directly to the NOC. If it is not, the satellite sends the request to another satellite located between the covering satellite and the NOC. This process continues until the access request is received by the NOC. After receiving the access request, the NOC checks its database to select an available satellite orbit submodel (SOS) assignment. The SOS assignment identifies the available time and frequency slot values over which the user terminal may communicate at the present time. The SOS assignment also identifies time/frequency slot changes for future use by the user terminal due to predictable events. Next, the NOC determines a starting point within the corresponding SOS assignment at which the user terminal should begin stepping through the SOS. This starting point corresponds to the current time and frequency slot values and a timing reference to define when the predictable events will occur for the given user. The SOS will, among other things, enable the user terminal to determine when to execute a call handoff due to some predictable event. For instance, the event may be that the satellite has moved such that the user terminal is now in a different cell of the same or a different satellite. The satellite returns the corresponding SOS assignment and starting point to the user terminal via the plurality of crosslinked satellites according to one embodiment.

Once the user terminal receives the SOS assignment and the starting point, the user terminal may begin to transmit messages or data packets. Each data packet contains a header indicating the destination to which the data should be sent. As with the request signal, the data is transmitted to the destination via one or more satellites, and for example through a plurality of crosslinked satellites.

During the course of communication with the user terminal, the satellites move relative to the earth. Thus, at any given point in time (which is predicted by the current SOS being implemented by the user terminal), the user terminal may no longer be covered by a particular local satellite or cell. When a satellite moves past a user terminal, a call handoff occurs to establish a communications link between the terminal and another satellite or a different cell of the current satellite. A call handoff may be needed for some other predictable event such as when the quantity of users in a cell increasing due to the cell movement over an area containing a non-uniform distribution of users. Some existing users may need call handoffs to maximize system efficiency in handling new users. During a call handoff, the user terminal may change the time and frequency slot values. In accordance with one preferred embodiment, the current SOS assignment which is being run by the user terminal allows the user terminal to calculate autonomously the time and frequency slots on which it must now communicate as a result of the call handoff. At the same time, the NOC has a record of every SOS assignment for each of the user terminals, so the NOC keeps track of all user terminals in the system.

Also during the course of communications between user terminals, various unpredictable events may occur. For example, a call handoff may be required not because of the motion of the satellites relative to the Earth, but because of the movement of the user terminal on the earth. Also, there may be an increase in demand upon the system due to one or more user terminals wanting to increase the rate at which they are currently transmitting data. Whatever the unpredictable event is, the current SOS run by the user terminals cannot account for such events. Thus, the NOC assigns a new starting point and may assign a new SOS assignment or a different SOS, SOS assignment and starting point to the user terminal. However, these unpredictable events may occur much less frequently than the predictable events and in any case the NOC does not need to communicate any overhead information to user terminals for predictable events. Thus, the amount of system capacity being used to communicate overhead information between user terminals and the NOC is minimized in the preferred embodiment.

DETAILED DESCRIPTION OF THE PREFERRED EMBODIMENTS

Figure 1:
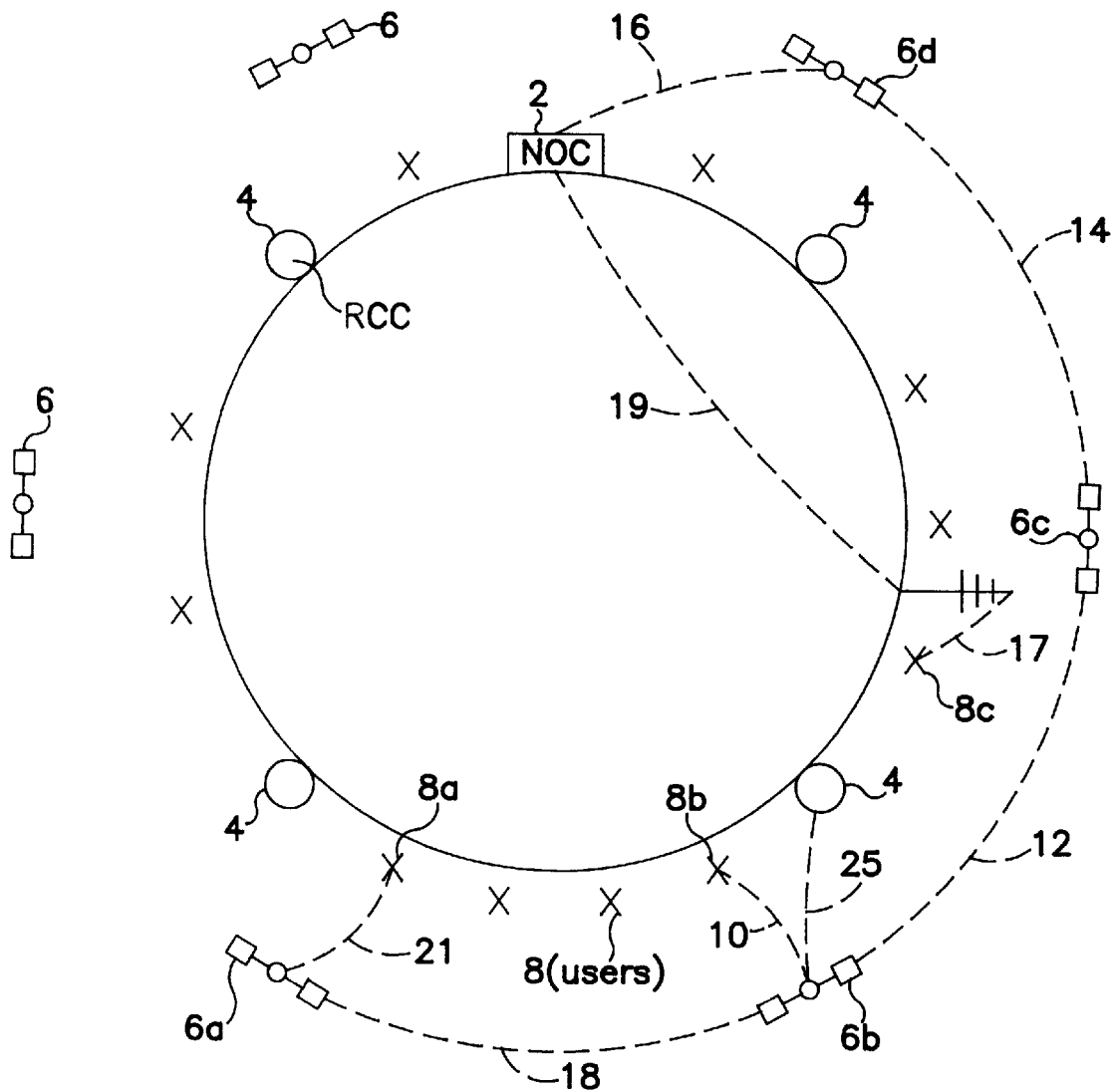
FIG. 1 illustrates an overall view of a satellite based telecommunications system.
Figure 2:
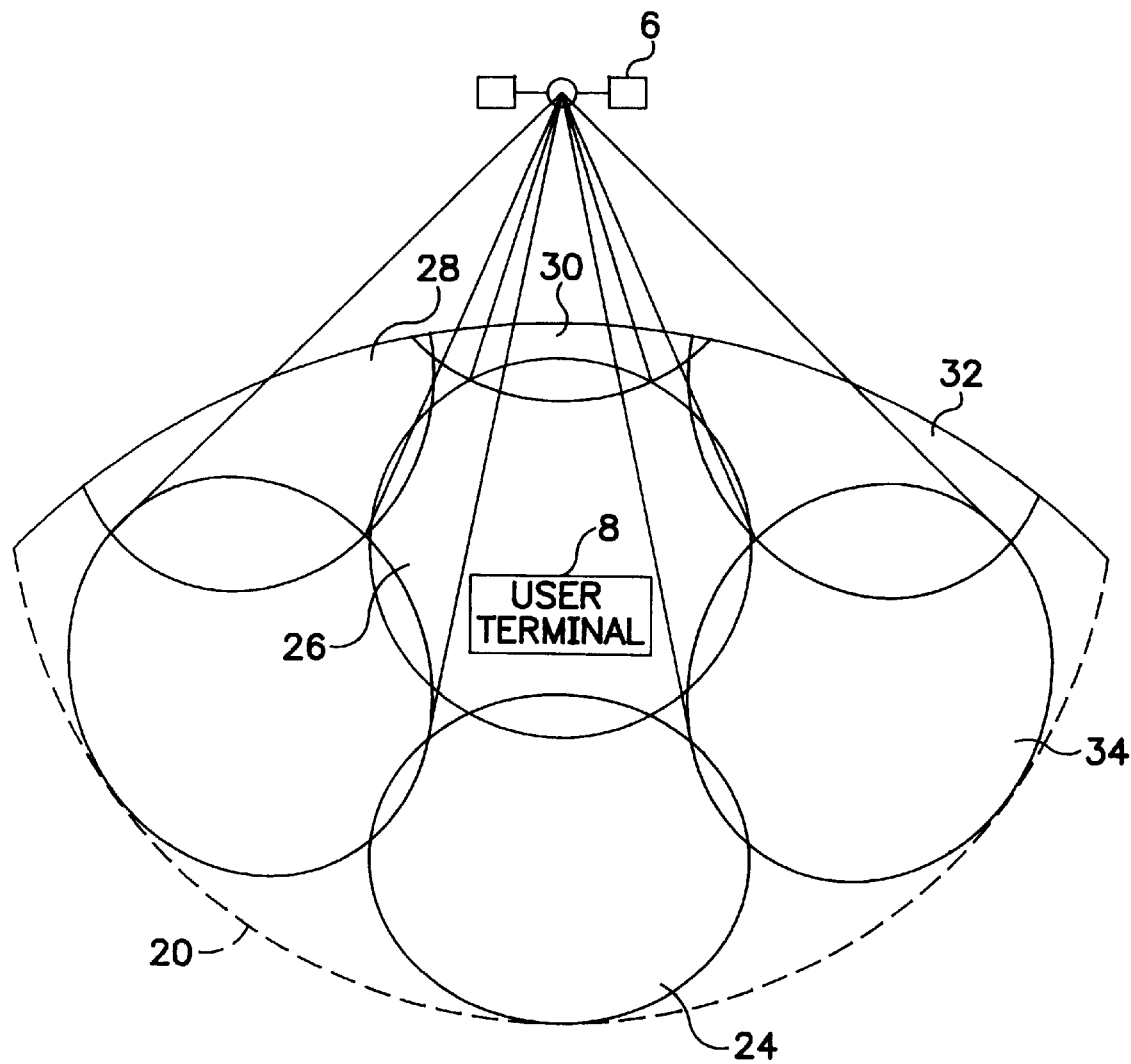
FIG. 2 illustrates a perspective view of a satellite based telecommunications system.
Figure 3:
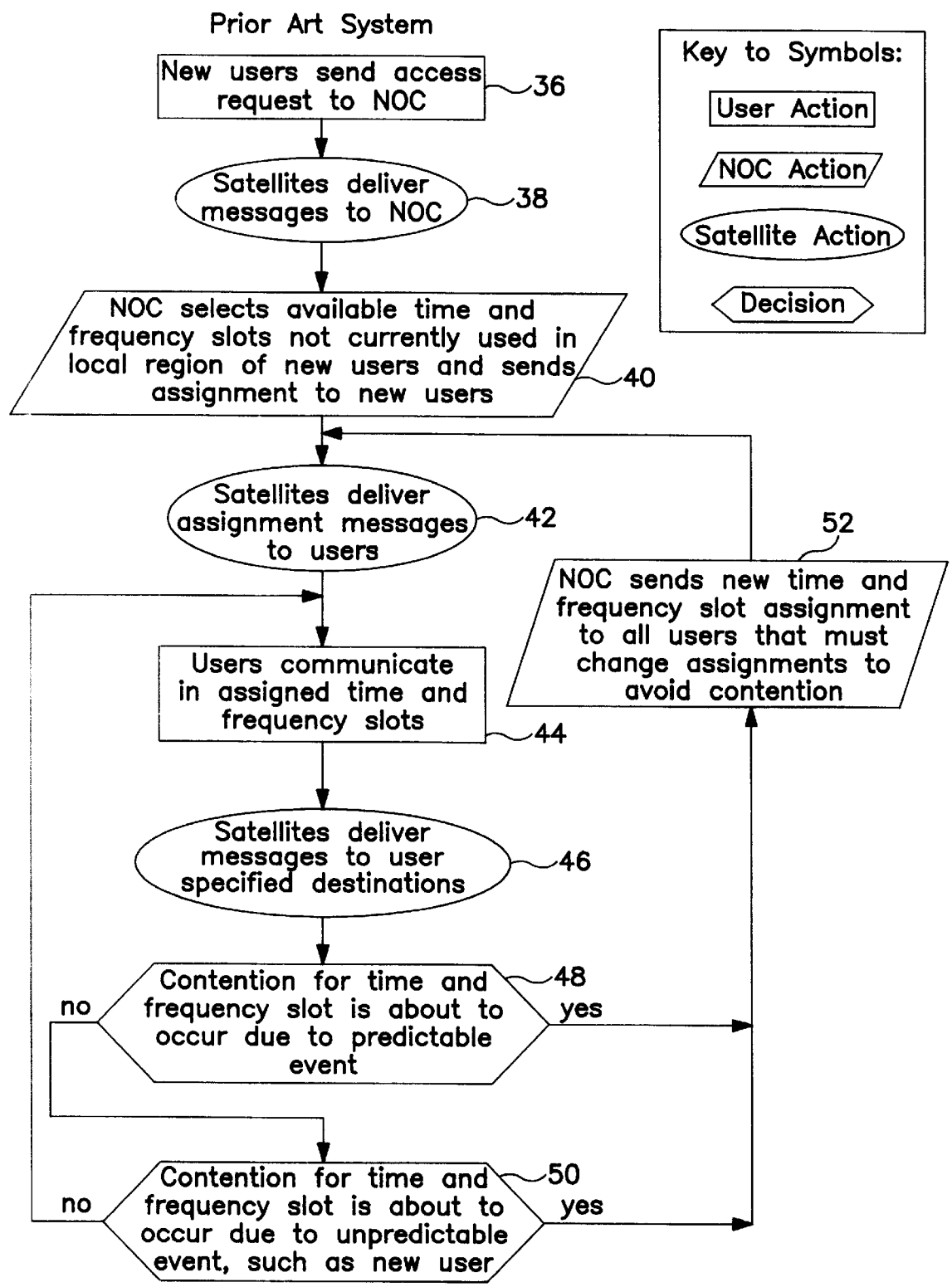
FIG. 3 illustrates a flow chart of the steps for communicating information over a satellite based telecommunications system in accordance with the prior art.

FIG. 1 generally illustrates an overview of a satellite based telecommunications system. The system includes a plurality of user terminals 8 which communicate with either other user terminals 8, regional control centers (RCC) 4 or the Network Operations Center (NOC) 2 via a plurality of satellites 6. Each user terminal 8 communicates over the system via a communications channel (time and frequency slot) which is assigned by either the local RCC 4 or the NOC 2. As illustrated in FIG. 2, each satellite 6 divides its coverage area 20 (e.g., field of view) into multiple cells 24–34. Each cell 24–34 may support one or more communications channels.

Referring back to FIG. 1, a user terminal 8b may request access to the system by sending a request signal to the NOC 2 via a path of one or more satellites 6. The request may be sent along a first link 10 between the user terminal 8b and the local satellite 6b by which the user terminal is covered. Then, the local satellite 6b determines whether the NOC 2 is within its coverage area, and if it is, the satellite 6b may transmit the request directly to the NOC 2. If the NOC 2 is not within the coverage area 20 of the local satellite 6b, the satellite 6b may send the request signal to the neighboring satellite 6c along the communication crosslink 12 between the satellites 6b and 6c. When the neighboring satellite 6c receives the request signal, it similarly determines whether the NOC 2 is in its coverage area 20. If the NOC 2 is not within satellite 6c coverage area 20, satellite 6c may send the request to the next satellite 6d via another communication crosslink 14. Finally, when the satellite 6d that contains the NOC 2 within its coverage area receives the request signal, satellite 6d sends the information directly to the NOC 2 via a communication link 16.

When the NOC 2 receives the request signal from the user terminal 8b, the NOC 2 may respond to the user terminal via the same crosslink path 16/14/12/10 or by a different path following the previously described procedure of crosslinks until the satellite 6b which contains user terminal 8b sends the response to the user terminal 8b. Due to the motion of the satellites during the time required to communicate the request and the response, different satellites may contain the NOC 2 and user terminal 8b during the response than during the request.

The NOC 2 response includes an assignment of a time slot value and a frequency slot value over which the requesting user terminal 8b may communicate. Once the user terminal 8b is assigned a time slot and frequency slot, the user terminal 8b may communicate on the assigned channel with other user terminals 8 or with conventional phone services through a user terminal 8 or RCC 4 which is connected to a phone system. The user terminal 8b transmits and receives communications messages over a channel defined by the assigned time and frequency slot to and from the local satellite 6b that covers the user terminal 8b. The communications message contains a header indicating the final destination thereof. From the header, the satellite 6b determines if the destination user terminal 8a is located in its coverage area or not. If the destination user terminal 8a is within the satellite's 6b coverage area, the satellite 6b may send the message directly to the user terminal 8a. If the destination user terminal 8a, however, is within a different satellite's coverage area, the local satellite 6b may send the message to an adjacent satellite located between the local satellite 6b and the destination user terminal 8a. Once the message reaches the satellite 6a that contains the destination user terminal 8a in its coverage area, satellite 6a transmits the message directly to the destination user terminal 8a over a communications link 21.

Because the satellites move relative to the earth, a user terminal communicating over a given channel will periodically change from one cell into another cell of the same satellite. Alternatively, a user terminal may change from one satellite's coverage area into another satellite's coverage area. When user terminals change between cells or coverage areas the system must conduct a call handoff. During call handoffs, the user terminal may need to switch channels (time slot and frequency slot) so as to avoid interference with user terminals operating with the same time and frequency slot in the "new" cell or in another cell within the frequency reuse distance. A call handoff may be a frequent occurrence in a satellite based telecommunication system.

Heretofore, in conventional systems, each time a call handoff was about to occur, the NOC would send a new channel assignment to the user terminal via one or more possibly crosslinked satellites, as described above. A portion of the capacity, previously available for communications messages, is wasted transferring the new channel assignment information. Because call handoffs may occur very frequently, the capacity of the system to send and receive communications messages is greatly increased by the present invention which, in one embodiment, performs channel switching autonomously implemented by the user terminal. The present invention describes such a system of user terminal based autonomous time and frequency slot assignments for call handoff.

Figure 4:
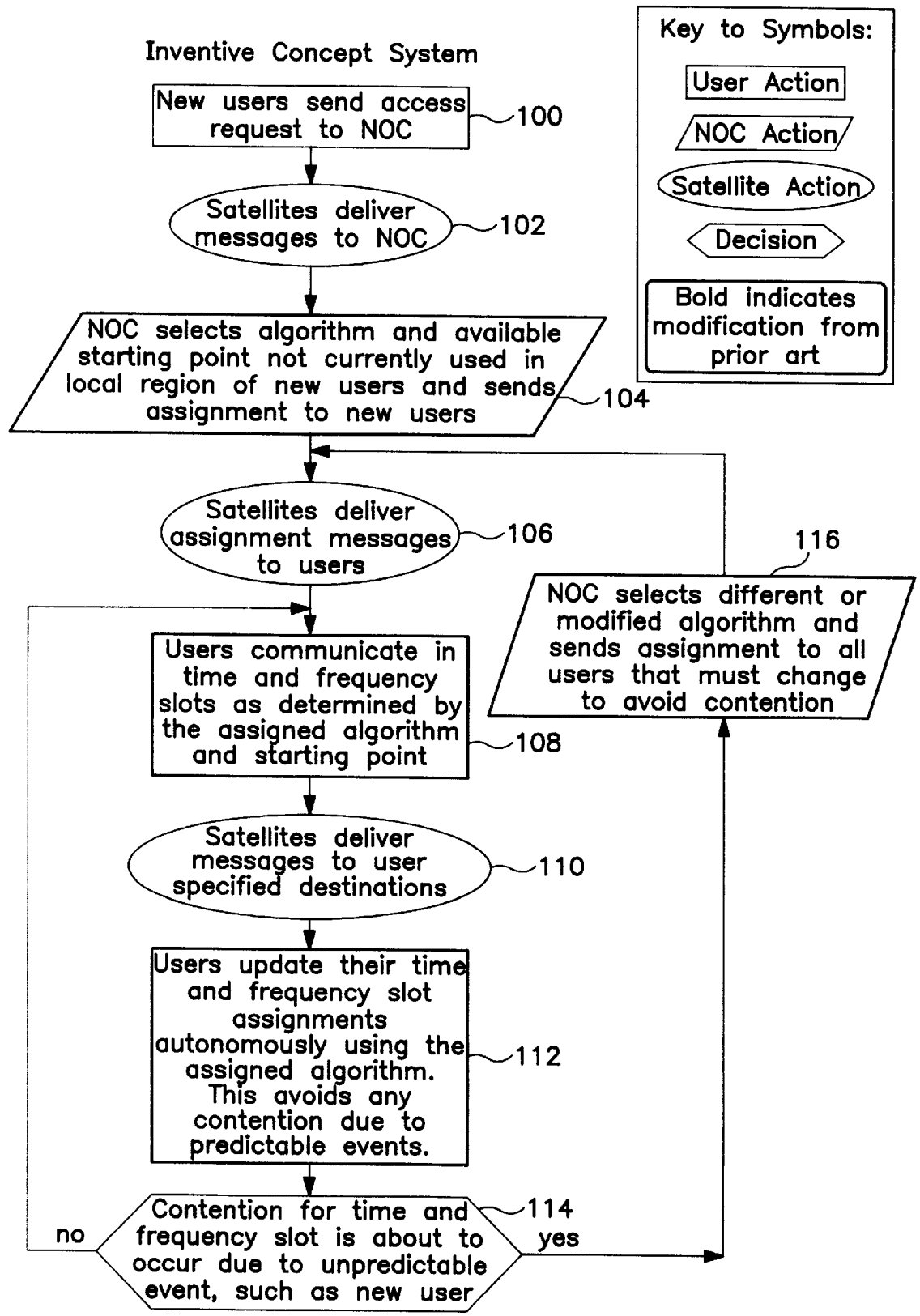
FIG. 4 illustrates a flow chart of the steps for communicating information over a satellite based telecommunications system in accordance with a preferred embodiment of the present invention.

FIG. 4 illustrates a flow chart of the method for communicating over a satellite based telecommunications system according to the present invention.

As illustrated in FIG. 4, a user terminal 8 initially sends an access request to the NOC 2 (step 100). The request informs the NOC 2 that the user terminal 8 wishes to access the system. The access request may be conveyed to the NOC 2 through a plurality of crosslinked satellites 6 around the globe (step 102), as described above. The NOC 2 then selects an available SOS assignment and starting point at which the user terminal should start running the SOS (step 104). The NOC 2 sends the assignment and starting point to the new user terminal 8, again via the crosslinked satellites 6. The "starting point" is based on the user terminal's location on the earth relative to the orbiting satellites, and on the presently available time and frequency slot combinations. The movement of the orbiting satellites relative to the earth is a predictable event (i.e., it is possible to predict the location of each satellite relative to the earth at any given point in time). Thus, the user terminal itself, given the appropriate starting point and running the assigned SOS, can effectively track the movement of the satellites relative to the earth and determine autonomously when a predictable event is about to occur. The user terminal can then autonomously determine from the assigned SOS which time and frequency slots to switch to when the event occurs, and then perform an autonomous update. Because the NOC keeps track of everything in the system by running the SOM and keeping a database of SOS assignments, the system guarantees that two or more user terminals will not run simultaneous SOSs that direct user terminals in the same cell or within the frequency reuse distance of the system to a single time and frequency slot combination. The NOC never assigns, to a new user terminal, an SOS and/or starting point that is currently being used by another user terminal in the same frequency reuse distance coverage area, or that is scheduled to be used shortly by another such user terminal. In the next step illustrated in FIG. 4(step 106), the satellite delivers the assignment messages to the user terminals that have requested access to the system. Now, the user terminals may communicate over the time and frequency slots determined by the user terminals running their respective SOS assignments at the designated starting point (step 108). A user terminal communicates under its assigned parameters by first sending a signal to the satellite by which the user terminal is covered, and then the satellite delivers the message to the particular destination specified in the header of the message signal as described above (step 110).

The present system allows a user terminal to update autonomously its time and frequency slot values due to a predictable event and thereby greatly increases the communication capacity of the overall system. For example, during the course of communication with the user terminal, the satellites move relative to the earth. This movement is predictable. In the prior art, each time any event occurs that required a channel change, the NOC had to assign a new time and frequency slot to the user terminal. These assignment messages represent overhead that may use a substantial amount of available capacity, thus decreasing the overall capacity of the system. In the present invention, however, when the satellite by which the user terminal is covered moves past the user terminal requiring a handoff, the user terminal updates autonomously the time and frequency slot values over which it is communicating (step 112). At the same time, the NOC is running the system's overall SOM in parallel with the SOSs being performed by each user terminal, so the NOC is able to keep track of all user terminals in the system. The preferred embodiment of the present invention may eliminate a majority of the overhead messages between user terminals and the NOC. Hence, the bandwidth that was wasted in communicating these assignment messages in the prior art system can now be used to communicate actual substantive communications messages.

Also during the course of communications between user terminals, various unpredictable events may occur. For example, a user handoff may be required not because of the motion of the satellites relative to the Earth, but because of the movement of the user terminal on the earth. Also, there may be contention among more than one user terminal for a time and frequency slot due to an increase in demand upon the system because of one or more user terminals wanting to increase the rate at which they are currently transmitting data (step 114). Individual user terminals cannot account for unpredictable events based on an SOS assignment. When these types of events occur, as illustrated in FIG. 4, the NOC selects a different or modified SOS (step 116) and sends the new SOS and/or starting point assignment, to all user terminals that must change to avoid signal interference. However, these unpredictable events may occur much more infrequently than the predictable events. Thus, the amount of overhead capacity being used to communicate between user terminals and the NOC is minimal in the preferred embodiment.

The preferred embodiment of the present invention cannot entirely eliminate transmission of assignment messages between the NOC and a user terminal since unpredictable events still require transmission of assignment messages. Nonetheless, because unpredictable events may occur much less frequently than predictable events, the present invention accounts for and eliminates a significant portion of the assignment messages required for updating a user terminal's channel.

The present invention is not limited to a satellite based telecommunication system. For example, as illustrated in FIG. 1, instead of sending an access request to the NOC 2 via a plurality of crosslinked satellites 6, a user terminal 8c may send a request signal to the NOC via standard telephone lines 17/19.

In another embodiment, the system may use several regional control centers (RCC) 4 instead of a single NOC 2.

In such a system, the function of the RCC 4 replaces that of the NOC. This may be advantageous because each RCC 4 only keeps track of regional user terminals, and thus the regional SOS that an individual RCC 4 uses is much less complicated than the overall SOM used by a single NOC 2 keeping track of every user terminal on the system. Further, the RCCs 4 may pass data between satellites through a variety of other means including regular phone lines, fiber optic lines, or any other communications system. When the RCC 4 passes data between satellites, each RCC 4 may use only one satellite 6b to pass data to a user terminal 8b, as opposed to a system where the data being transmitted from a user terminal 8b must travel via a plurality of cross-linked satellites 6b/6c/6d before reaching the single NOC. The elimination of transmission via a plurality of linked satellites is possible in a system using RCCs 4 because in such a system, every satellite contains at least one RCC 4 in its coverage area at all times. Alternatively, a system may have only one RCC 4 for more than one satellite. In this case cross-links may be used, but less than for a single NOC 2 system without any RCC 4.

Additionally, although the preferred embodiment of the invention uses autonomous time and frequency slot assignments for call handoff, the invention may be applied to any circumstance where a user terminal's parameters (channel assignment or otherwise) must be updated due to a predictable event.

The methods described herein may be applied to applications other than communication systems. Any application using a central controller to coordinate operations in multiple separate subunits. Such applications may use these methods to allow the subunits to autonomously react to predictable events by implementing a subset of the central controller process, and with modification from the central controller for unpredictable events.

While particular elements, embodiments and applications of the present invention have been shown and described, it will be understood, of course, that the invention is not limited thereto since modifications may be made by those skilled in the art, particularly in light of the foregoing teachings. It is, therefore, contemplated by the appended claims to cover such modifications as incorporate those features which come within the spirit and scope of the invention.

I claim:

1. In a satellite based telecommunications system for transmitting communications information to and from a first user terminal, a method for controlling switching between communications channels comprising the steps of: (a) transmitting a request for access from a user terminal to a control center via at least one satellite;

(b) selecting at said control center assignment information for a first communications channel, said assignment information identifying predictable events requiring said first user terminal to change between first and second communications channels;

(c) transmitting said assignment information to said first user terminal;

(d) after transmitting said assignment information to said first user terminal, establishing a communications link over said first communications channel with said first user terminal; and (e) after establishing said communications link, said first user terminal autonomously switching said first communications channel to said second communications channel based on said assignment information indicating that a predictable event is about to occur preventing said first user terminal from continuing to use said first communications channel.

2. The method according to claim 1, wherein the steps of transmitting said assignment information to said first user, establishing a communications link over said first communications channel, and autonomously switching said first communications channel to said second communications channel are repeated until termination of transmission of said communications information.

3. The method according to claim 1, further comprising the steps of selecting channel parameters identifying a first channel over which said first user terminal communicates, and transmitting said channel parameters to said first user terminal via said at least one satellite before establishing said communications link over said first channel with said first user terminal.

4. The method according to claim 1, wherein said model assignment information comprises a satellite orbit submodel modeling an orbital pattern of at least one satellite to identify said predictable events.

5. The method according to claim 4, wherein said model assignment information further comprises a starting point identifying a current position of at least one satellite within said orbital pattern.

6. The method according to claim 1, wherein said predictable event identifies the point in time at which one cell coverage area passes beyond the first user terminal and a different cell coverage area covers the first user terminal due to satellites orbiting the Earth.

7. The method according to claim 1, further comprising the step of selecting, at the control center, new model assignment information for said second communications channel when an unpredictable event occurs, said new model assignment information identifying future predictable events requiring said first user terminal to change between said second communications channel and a third communications channel.

8. The method according to claim 7, further comprising the steps of selecting new channel parameters identifying said second communications channel, over which said first user terminal communicates when said unpredictable event occurs, and transmitting said new model assignment information to said first user terminal via said at least one satellite.

9. The method according to claim 7, wherein said unpredictable event represents one or more new user terminals requesting access to the system.

10. The method according to claim 7, wherein said unpredictable event represents said first user terminal moving out of one cell coverage area into a different cell coverage area due to movement of said first user terminal.

11. The method according to claim 7, wherein said unpredictable event represents a second user terminal located within the same cell coverage area as said first user terminal requesting an increase in the rate of data transmission.

12. A satellite based telecommunications system for transmitting communications information to and from a first user terminal, comprising:
 a telecommunication satellite;
 a user terminal for transmitting and receiving said communications information over a communications channel in a communications link with said satellite;
 a control center for maintaining said communications link with said user terminal via said satellite, said user terminal establishing said communications link by requesting access to the system from said control center, said control center responding to said request for access by selecting and transmitting model assignment information for a first communications channel to said first user terminal, said model assignment information identifying future predictable events requiring switching by said first user terminal between said first communications channel and a second communications channel, said control center transmitting said model assignment information to said first user terminal, said user terminal, while maintaining said communications link over said first communications channel, autonomously switching said communications link to said second communications channel based on said model assignment information identifying a predictable event that prevents said first user terminal from continuing to use said first communications channel.

13. The system according to claim 12, wherein said control center responds to said request for access by selecting and transmitting channel parameters to said first user terminal, said channel parameters identifying said first communications channel over which said first user terminal communicates, and wherein said control center transmits said channel parameters to said first user terminal.

14. The system according to claim 12, further comprising a plurality of interlinked telecommunication satellites linked to said control center.

15. The system according to claim 12, wherein said control center selects new model assignment information for a second communications channel when an unpredictable event occurs, and transmits said new model assignment information to said first user terminal via said telecommunication satellite, said new model assignment information identifying future predictable events requiring said first user terminal to autonomously switch said second communications channel to a third communications channel based on said new model assignment information.

16. The system according to claim 15, wherein said control center selects new channel parameters identifying a second communications channel over which said first user terminal communicates, and transmits said new channel parameters to said first user terminal via said telecommunication satellite.

17. The system according to claim 15, wherein said unpredictable event represents one or more new user terminals requesting access to said system.

18. The system according to claim 15, wherein said unpredictable event represents said first user terminal moving out of one cell coverage area into a different cell coverage area due to movement of said first user terminal.

19. The system according to claim 15, wherein said unpredictable event represents a request for an increased data transmission rate by a second user terminal located within the cell coverage area covering said first user terminal.

20. The system according to claim 12, wherein said model assignment information comprises a satellite orbit submodel identifying a satellite orbit pattern of at least one satellite.

21. The system according to claim 20, wherein said model assignment information further comprises a starting point within said satellite orbit pattern.

22. The system according to claim 12, wherein said predictable event represents one cell coverage area moving beyond said first user terminal and a different cell coverage area moving to cover said first user terminal as satellites orbit the Earth.

23. A communications system for transmitting communications information to and from a first user terminal, comprising:

a user terminal for transmitting and receiving communications information over a communications channel; a plurality of regional control centers for maintaining a communications link with said first user terminal, said first user terminal establishing said communications link by requesting access to the system, one of said regional control centers responding to said request for access by selecting and transmitting model assignment information for a first communications channel to said first user terminal, said model assignment information identifying future predictable events requiring switching by the first user terminal between said first communications channel and a second communications channel, said one regional control center transmitting said model assignment information to said first user terminal, said first user terminal, while maintaining said communications link over said first channel, autonomously switching said first communications channel to said second communications channel based on said model assignment information which identifies a predictable event that prevents said first user terminal from continuing to use said first communications channel.

24. The system according to claim 23, wherein said communication system is satellite based.

25. The system according to claim 24, further comprising a plurality of interlinked satellites linked to said regional control centers.

26. The system according to claim 25, wherein said model assignment information comprises a satellite orbit submodel identifying a satellite orbit pattern of at least one satellite.

27. The system according to claim 26, wherein said model assignment information further comprises a starting point.

28. The system according to claim 23, wherein said communication system is a land based telephone system.

29. The system according to claim 23, wherein said communication system is a fiber optics system.

30. The system according to claim 23, wherein said one regional control center responds to said request for access by selecting and transmitting channel parameters, said channel parameters identifying said first channel over which said first user terminal communicates, and said one regional control center transmits said channel parameters to said first user terminal.

31. The system according to claim 23, wherein said one regional control center selects new model assignment information for said second communications channel when an unpredictable event occurs, and transmits said new model assignment information to said first user terminal, said new model assignment information identifying future predictable events requiring said first user terminal to switch autonomously said second communications channel to a third communications channel based on said new model assignment information.

32. The system according to claim 31, wherein said control center selects new channel parameters identifying a second channel over which said first user terminal communicates, and transmits said new channel parameters to said first user terminal.

33. The system according to claim 31, wherein said unpredictable event is one or more new user terminals requesting access to said system.

34. The system according to claim 31, wherein said unpredictable event is said first user terminal moving out of one cell coverage area into a different cell coverage area due to movement of said first user terminal.

35. The method according to claim 31, wherein said unpredictable event is any user terminal located within the same cell coverage area as said first user terminal requesting an increase in the rate of data transmission.

36. The system according to claim 25, wherein said predictable event represents one cell coverage area moving beyond, and a different cell coverage area moving to cover, said first user terminal as satellites orbit the Earth.

* * * * *